(12) United States Patent
Kish et al.

(10) Patent No.: US 8,833,870 B2
(45) Date of Patent: Sep. 16, 2014

(54) HILL ROLL-BACK AND ROLL-FORWARD CONTROL SYSTEMS AND METHODS

(75) Inventors: Jonathan P. Kish, Royal Oak, MI (US); Jennifer A. Moschetta, Novi, MI (US); Joseph B. Burtch, Lake Orion, MI (US); Michael Douglas Rizzo, White Lake, MI (US); Mark A. Vernacchia, Northville, MI (US)

(73) Assignee: GM Global Technology Operations LLC

( * ) Notice: Subject to any disclaimer, the term of this patent is extended or adjusted under 35 U.S.C. 154(b) by 475 days.

(21) Appl. No.: 13/011,147

(22) Filed: Jan. 21, 2011

(65) Prior Publication Data

US 2012/0187750 A1 Jul. 26, 2012

(51) Int. Cl.
- *B60T 8/32* (2006.01)
- *B60T 13/66* (2006.01)
- *B60T 7/12* (2006.01)

(52) U.S. Cl.
CPC ............. *B60T 7/122* (2013.01); *B60T 2201/06* (2013.01); *B60T 13/662* (2013.01)
USPC .......................................... 303/192; 303/191

(58) Field of Classification Search
USPC ......... 303/191, 192, 9, 10, 115.4; 188/DIG. 2
See application file for complete search history.

(56) References Cited

U.S. PATENT DOCUMENTS

| | | | | |
|---|---|---|---|---|
| 5,957,552 A * | 9/1999 | Claussen et al. | ............... | 303/192 |
| 6,199,964 B1 * | 3/2001 | Ota et al. | ...................... | 303/192 |
| 6,321,144 B1 * | 11/2001 | Crombez | ........................ | 701/22 |
| 6,378,957 B1 * | 4/2002 | V.ang.gstedt | ................ | 303/9.62 |
| 7,137,674 B2 * | 11/2006 | Goebels | ........................ | 303/191 |
| 7,318,629 B1 * | 1/2008 | Sun et al. | ...................... | 303/146 |
| 7,319,927 B1 * | 1/2008 | Sun et al. | ........................ | 701/93 |
| 7,444,221 B2 * | 10/2008 | Yamada et al. | .................. | 701/70 |
| 7,484,816 B2 * | 2/2009 | Maruyama et al. | ........... | 303/191 |
| 2002/0038977 A1 * | 4/2002 | Nitta et al. | ..................... | 303/138 |
| 2002/0145333 A1 * | 10/2002 | Faye | ............................. | 303/140 |
| 2005/0029865 A1 * | 2/2005 | Kobayashi | .................... | 303/191 |
| 2006/0145533 A1 * | 7/2006 | Braeuer et al. | ................ | 303/191 |
| 2007/0090691 A1 * | 4/2007 | Maskell et al. | ............... | 303/192 |
| 2007/0228823 A1 * | 10/2007 | Kokubo et al. | ............... | 303/155 |
| 2008/0086252 A1 * | 4/2008 | Nakayama | ....................... | 701/80 |
| 2009/0187324 A1 * | 7/2009 | Lu et al. | .......................... | 701/94 |

* cited by examiner

*Primary Examiner* — Bradley King
*Assistant Examiner* — Stephen Bowes

(57) ABSTRACT

A triggering module selectively generates a triggering signal when a vehicle is stopped, a grade of a surface is one of greater than a predetermined positive grade and less than a predetermined negative grade, and a brake pedal position is greater than a predetermined position. A brake actuator provides brake fluid to a braking system when the brake pedal position is greater than the predetermined position. A brake releasing module, after the triggering signal is generated, begins releasing the brake fluid from the braking system a predetermined period after the brake pedal position reaches the predetermined position. A brake applying module selectively operates a brake fluid pump after the triggering signal is generated based on a comparison of a vehicle speed and a predetermined vehicle speed. The brake fluid pump provides brake fluid to the braking system when the brake fluid pump is operated.

15 Claims, 8 Drawing Sheets

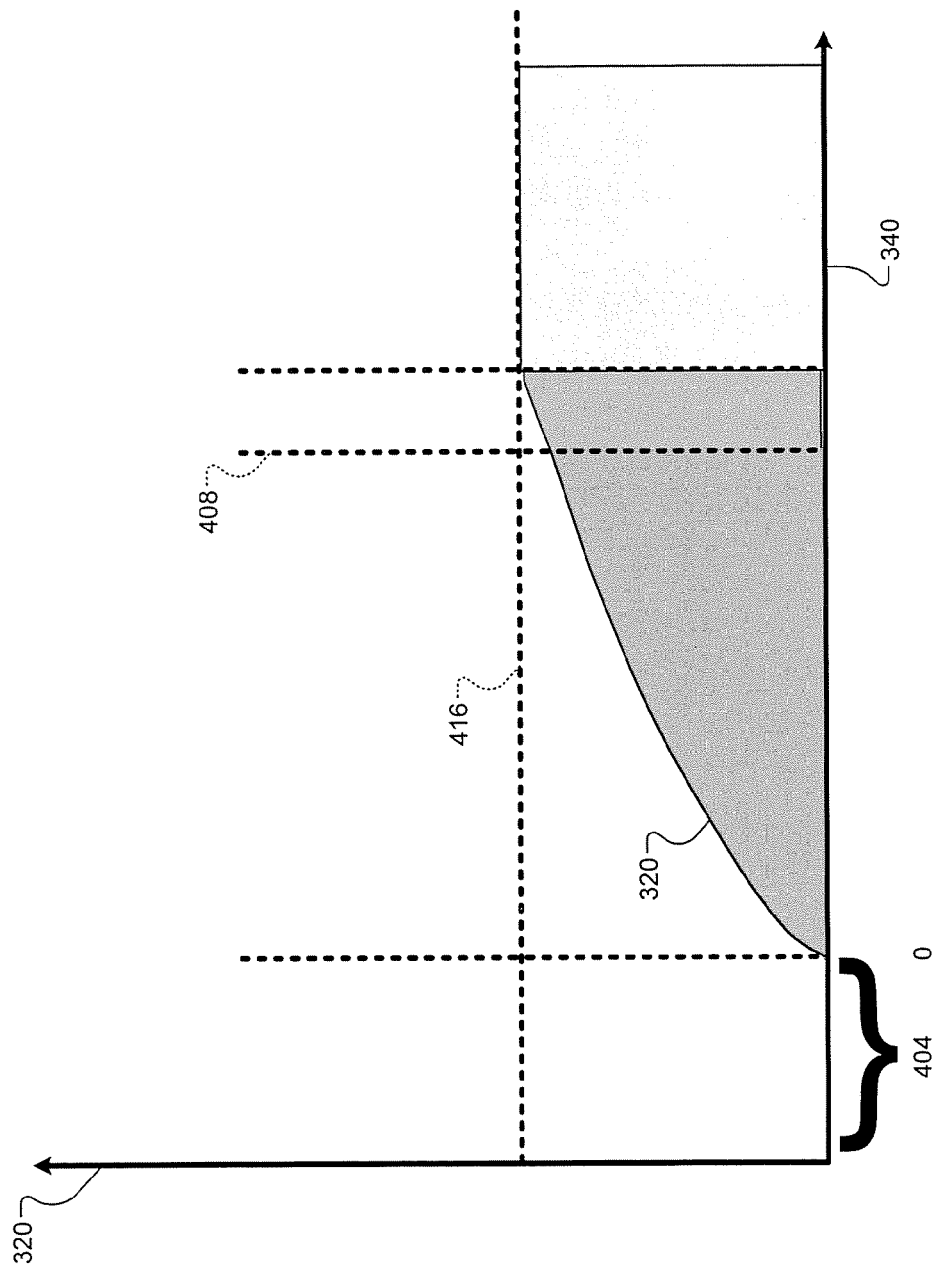

HILL ROLL-BACK AND ROLL-FORWARD CONTROL SYSTEMS AND METHODS

FIELD

The present disclosure relates to vehicles and more particularly to vehicle roll-back and vehicle roll-forward systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture to produce drive torque. One or more electric motors may additionally or alternatively produce drive torque. Drive torque is provided to a transmission, and the transmission transfers torque to one or more wheels to propel the vehicle. In some vehicles, the transmission includes a dual clutch transmission (DCT).

A DCT includes two input clutches: each clutch is associated with a respective input shaft. An odd gearset is coupled to one of the two input shafts, and an even gearset is coupled to the other of the two input shafts. At a given time between gear shifts, one of the two clutches receives drive torque while the other of the two clutches does not. In this manner, drive torque is transferred to one of the two input shafts and gearsets at the given time.

Gear synchronizers move along a shaft of the DCT to mechanically couple an output gear of one of the gearsets to an output shaft. Gear actuators control the positions and engagement of the synchronizers. As torque is transferred to one of the two input shafts at the given time, an oncoming gear ratio associated with the other of the two input shafts may be mechanically coupled to the output shaft in anticipation of a gear shift. The gear shift from the current gear ratio to the oncoming gear ratio may be accomplished in a relatively short period by disengaging one clutch and engaging the other clutch.

SUMMARY

A triggering module selectively generates a triggering signal when a vehicle is stopped, a grade of a surface is one of greater than a predetermined positive grade and less than a predetermined negative grade, and a brake pedal position is greater than a predetermined position. A brake actuator provides brake fluid to a braking system when the brake pedal position is greater than the predetermined position. A brake releasing module, after the triggering signal is generated, begins releasing the brake fluid from the braking system a predetermined period after the brake pedal position reaches the predetermined position. A brake applying module selectively operates a brake fluid pump after the triggering signal is generated based on a comparison of a vehicle speed and a predetermined vehicle speed. The brake fluid pump provides brake fluid to the braking system when the brake fluid pump is operated.

A system for a vehicle on a surface includes a direction triggering module and a brake applying module. The direction triggering module selectively generates a signal when one of (i) a direction of movement of a vehicle is in a first direction and a desired mode of operation is a second direction that is opposite the first direction and (ii) the direction of movement is in the second direction and the desired mode of operation is in the first direction. The brake applying module selectively operates a brake fluid pump after the signal is generated based on a comparison of a vehicle speed and a predetermined vehicle speed. The brake fluid pump pumps brake fluid to a braking system of the vehicle when the brake fluid pump is operated, and a brake actuator provides brake fluid to the braking system based on actuation of a brake pedal.

A method for a vehicle on a surface, includes: selectively generating a triggering signal when the vehicle is stopped, a grade of the surface is one of greater than a predetermined positive grade and less than a predetermined negative grade, and a brake pedal position is greater than a predetermined brake pedal position; after the triggering signal is generated, beginning to release the brake fluid from the braking system a predetermined period after the brake pedal position reaches the predetermined brake pedal position; and selectively operating a brake fluid pump after the triggering signal is generated based on a comparison of a vehicle speed and a predetermined vehicle speed. A brake actuator provides brake fluid to a braking system of the vehicle when the brake pedal position is greater than the predetermined brake pedal position, and the brake fluid pump provides brake fluid to the braking system when the brake fluid pump is operated.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A-4C are example graphs of vehicle speed as a function of distance or time according to the present disclosure.

DETAILED DESCRIPTION

Figure 1:
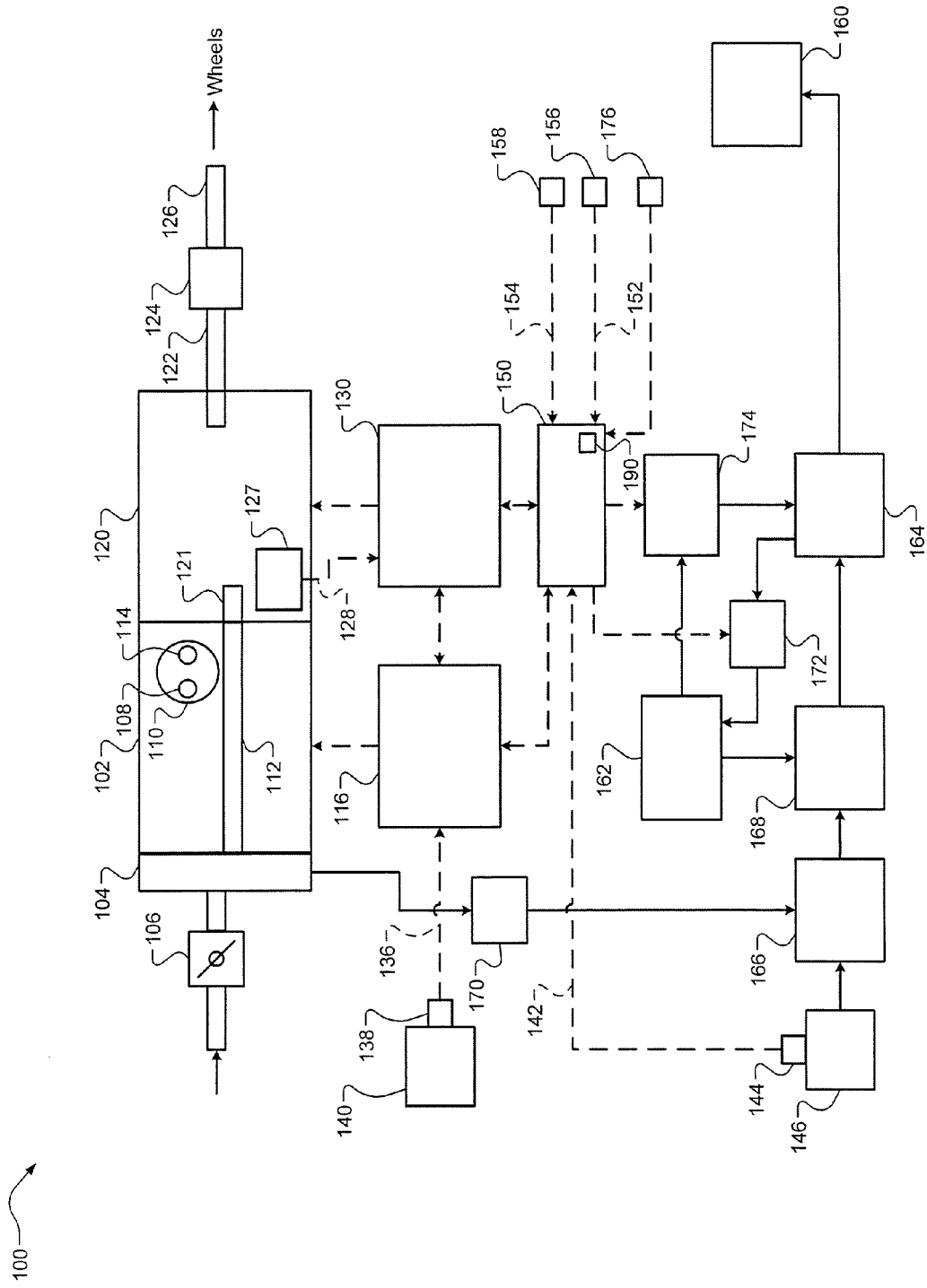
FIG. 1 is a functional block diagram of an example vehicle system according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

A driver selectively applies pressure to a brake pedal within a passenger cabin of a vehicle to perform vehicle braking. A brake actuator (e.g., a master cylinder) provides brake fluid to a brake system when pressure is applied to the brake pedal. Brake fluid is generally released from the brake system as pressure is removed from the brake pedal. However, if the vehicle is stopped on a grade and brake fluid is released, the vehicle may roll down the grade.

When the vehicle is stopped and the grade is greater than a predetermined grade, a control module according to the present disclosure does not release brake fluid as pressure is removed from the brake pedal. The control module begins releasing brake fluid from the brake system a predetermined period after the pressure is removed from the brake pedal. In this manner, the control module holds the vehicle to prevent the vehicle from rolling down the grade for the predetermined period after the pressure is removed from the brake pedal.

After the predetermined period, the control module controls the release of brake fluid from the brake system. A valve may control the flow of brake fluid from the brake system to a brake fluid reservoir. The control module may control the opening of the valve based on the distance that the vehicle has rolled down the grade.

The control module also monitors the vehicle speed as the vehicle rolls down the grade. The control module selectively operates a brake fluid pump to limit the vehicle speed to a predetermined maximum speed as the vehicle rolls down the grade. The brake fluid pump provides brake fluid to the braking system to perform vehicle braking.

Referring now to FIG. 1, a functional block diagram of an exemplary vehicle system 100 is presented. An engine 102 generates drive torque for the vehicle. One or more electric motors (or motor-generators) may additionally or alternatively generate drive torque. While the engine 102 will be discussed as a spark-combustion internal combustion engine, the engine 102 may include another suitable type of engine, such as a compression-combustion type engine, an electric type engine, a hybrid type engine, or another suitable type of engine.

Air is drawn into the engine 102 through an intake manifold 104. A throttle valve 106 controls airflow into the intake manifold 104. One or more fuel injectors 108 mix fuel with air to form a combustible air/fuel mixture. The air/fuel mixture is combusted within cylinders of the engine 102, such as cylinder 110. Although the engine 102 is depicted as including one cylinder, the engine 102 may include a greater number of cylinders.

The cylinder 110 includes a piston (not shown) that is mechanically linked to a crankshaft 112. One combustion event within the cylinder 110 may include four phases: an intake phase, a compression phase, a combustion (or expansion) phase, and an exhaust phase. During the intake phase, the piston moves toward a bottommost position and draws air into the cylinder 110. During the compression phase, the piston moves toward a topmost position and compresses the air or air/fuel mixture within the cylinder 110.

During the combustion phase, spark from a spark plug 114 may ignite the air/fuel mixture. The combustion of the air/fuel mixture drives the piston back toward the bottommost position, and the piston rotatably drives the crankshaft 112. Resulting exhaust gas is expelled from the cylinder 110 to complete the exhaust phase and the combustion event. An engine control module (ECM) 116 controls the torque output of the engine 102.

The engine 102 outputs torque to a transmission 120. A flywheel (not shown), such as a dual-mass flywheel (DMF), may connect the crankshaft 112 with a transmission input shaft 121. The DMF may be implemented to prevent vibration from being transferred from the crankshaft 112 to the transmission input shaft 121 and vice versa.

The transmission 120 selectively transfers torque to one or more wheels of the vehicle (not shown). More specifically, torque input to the transmission 120 is selectively transmitted to a transmission output shaft 122 based on a gear ratio engaged within the transmission 120. The transmission output shaft 122 transfers torque to a differential 124, and the differential 124 transfers torque to one or more wheels (not shown) via a driveline 126. In various implementations, the differential 124 may be implemented within the transmission 120, such as in front wheel drive vehicles.

Figure 2:
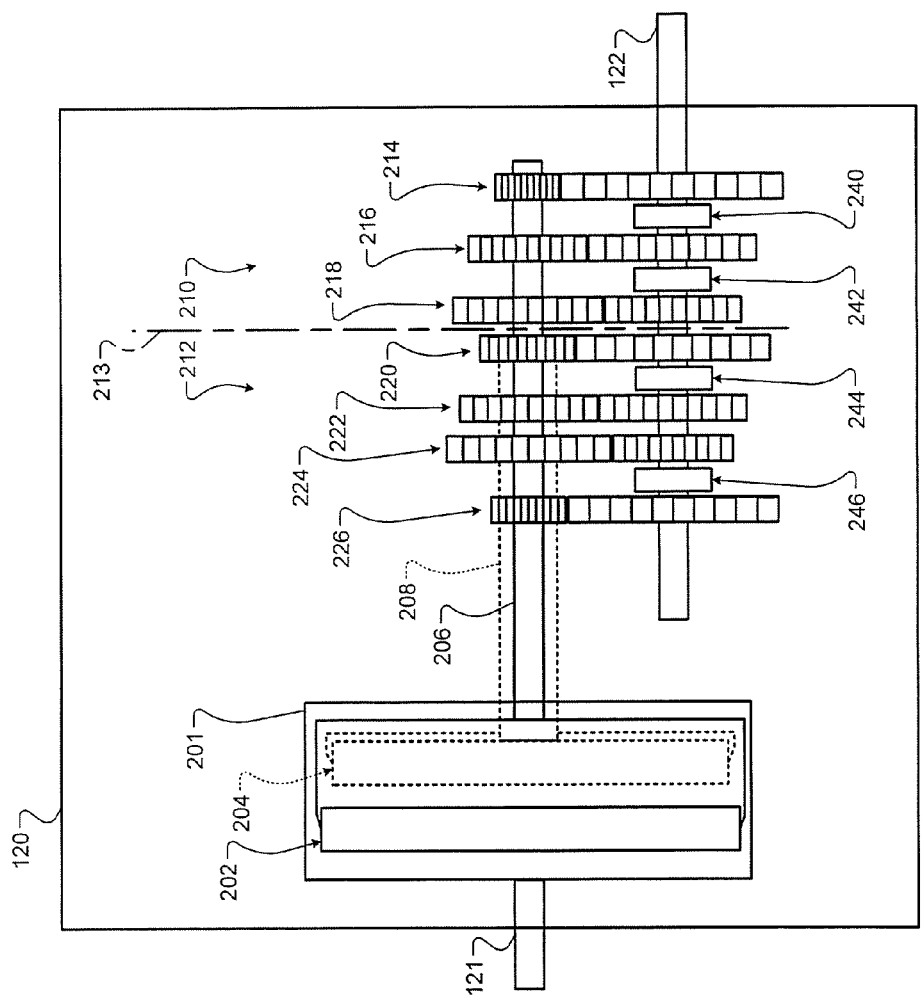
FIG. 2 is an example diagram of a dual clutch transmission (DCT) according to the present disclosure.

The transmission 120 may include and will be hereafter referred to as a dual clutch transmission (DCT) (FIG. 2). A current gear ratio (a gear ratio is also referred to as a drive ratio) may be defined as the ratio of an input shaft speed of the DCT 120 to an output shaft speed of the DCT 120. The input shaft speed and the output shaft speed of the DCT 120 may be measured using one or more sensors. The input shaft speed may be measured using one or more sensors based on rotation of the transmission input shaft 121. In various implementations, the input shaft speed may be determined based on engine speed (e.g., rotational speed of the crankshaft 112 or the DMF) or another suitable measure of the input shaft speed. The output shaft speed may be measured using one or more sensors based on rotation of the transmission output shaft 122. In various implementations, the output shaft speed may be determined based on a differential speed, an axle speed, a wheel speed, or another suitable measure of the output shaft speed.

Referring now to FIG. 2, an example diagram of the DCT 120 is presented. The DCT 120 includes a clutch pack 201 that includes two clutches: a first clutch 202 and a second clutch 204. The first clutch 202 is linked to a first input shaft 206, and the second clutch 204 is linked to a second input shaft 208. The first and second input shafts 206 and 208 may be implemented in a nested orientation. More specifically, one of the first and second input shafts 206 and 208 may be located concentrically within the other of the first and second input shafts 206 and 208. For example only, the first input shaft 206 may be located concentrically within the second input shaft 208 as shown in FIG. 2.

Generally, the first and second clutches 202 and 204 are controlled such that one of the first and second clutches 202 and 204 (and therefore one of the first and second input shafts 206 and 208) receives drive torque from the transmission input shaft 121 at a given time. When the first clutch 202 receives drive torque, torque is transferred to an odd gearset 210 via the first input shaft 206. Torque is transferred to an even gearset 212 via the second input shaft 208 when the second clutch 204 receives drive torque. Dashed line 213 is shown for purposes of illustration only, to illustrate the separation of the odd and even gearsets 210 and 212. For example only, the odd gearset 210 may be located to the right of the dashed line 213 and the even gearset 212 may be located to the left of the dashed line 213 in various implementations.

The gears of the odd gearset 210 are linked to and rotate with the first input shaft 206. The gears of the even gearset 212 are linked to and rotate with the second input shaft 208. The odd gearset 210 includes pairs of input gears and output gears (each pair referred to as a gearset) that provide odd numbered gear ratios. For example only, the odd gearset 210 may include gearsets 214, 216, and 218 when the DCT 120 is capable of providing six forward gear ratios (i.e., is a six speed transmission). The gearsets 214, 216, and 218 correspond to a first gear ratio, a third gear ratio, and a fifth gear ratio, respectively.

The even gearset 212 includes pairs of input gears and output gears (each pair referred to as a gearset) that provide even numbered gear ratios. For example only, the even gearset 212 may include gearsets 220, 222, and 224 when the DCT 120 is capable of providing six forward gear ratios. The gearsets 220, 222, and 224 correspond to a second gear ratio, a fourth gear ratio, and a sixth gear ratio, respectively. One or more reverse gearsets, such as reverse gearset 226, may also be provided. The numerical label attributed to a given gearset (e.g., first-sixth) may increase as the gear ratio increases.

The gearsets 214-226 each include an input gear and an output gear. The input gears of the gearsets 214-218 are coupled to and rotate with the first input shaft 206. The input gears of the gearsets 220-226 are coupled to and rotate with the second input shaft 208. The input and output gears of a given gearset of the gearsets 214-226 are meshed, and rotation of the one of the input and output gears of the given gearset causes rotation of the other of the input and output gears of the given gearset. In this manner, the input gear and the output gear of the given gearset provide the gear ratio of the given gearset when the given gearset is engaged.

The first and second clutches 202 and 204 control whether torque is transferred to the odd gearset 210 or to the even gearset 212, respectively. More specifically, the first and second clutches 202 and 204 control whether torque is transferred to the first input shaft 206 or to the second input shaft 208, respectively. Synchronizers 240, 242, 244, and 246 slide along the transmission output shaft 122 and mechanically couple the output gears of the gearsets 214-224 to the transmission output shaft 122.

The DCT 120 allows the current gear ratio to be engaged within the DCT 120 while an oncoming gear ratio may be selected and coupled to the transmission output shaft 122 in anticipation of a gear shift to an oncoming gear ratio. The current gear ratio may be changed to the oncoming gear ratio by the one of the first and second clutches 202 and 204 that receives drive torque. In this manner, the DCT 120 allows for rapid gear shifts between sequential gear ratios.

Referring back to FIG. 1, the DCT 120 may also include an internal mode switch (IMS) 127. A user of the vehicle may actuate (e.g., rotate) a rotatable portion (e.g., a core or a housing) of the IMS 127 to select a desired mode of operation. For example only, the desired mode of operation may be Park, Neutral, Drive, a forward gear ratio, or Reverse. The IMS 127 generates an IMS state 128 that indicates the desired mode of operation. In various implementations, the desired mode of operation selected may be determined based on one or more signals output by the IMS 127.

A transmission control module (TCM) 130 controls the current gear ratio engaged within the DCT 120 by controlling the clutch, input shaft, and gearset that receives drive torque and the gearset that is coupled to the transmission output shaft 122. The TCM 130 may control the DCT 120 based on various shift maps, measured parameters (e.g., throttle opening and vehicle speed), and/or inputs from a driver (e.g., upshifts and downshift commands). The TCM 130 may control the DCT 120 further based on one or more measured parameters and/or one or more requests. For example only, the TCM 130 may receive requests from the ECM 116 and/or one or more other modules of the vehicle. The ECM 116 and the TCM 130 may communicate via a controller area network (CAN), for example, to coordinate shifts within the DCT 120 and/or to share one or more parameters.

The ECM 116 controls the torque output of the engine 102. For example only, the ECM 116 may control opening of the throttle valve 106, the amount and/or timing of fuel injection, spark timing, opening and closing of intake and/or exhaust valves (not shown), boost provided by a boost device (not shown), and/or one or more other suitable engine operating parameters.

The ECM 116 may control the torque output of the engine 102 based on an accelerator pedal position (APP) 136 generated by an APP sensor 138. The APP sensor 138 measures position of an accelerator pedal 140 and generates the APP 136 based on the position of the accelerator pedal 140. One or more additional APP sensors may also be provided.

The ECM 116 may control the torque output of the engine 102 further based on a brake pedal position (BPP) 142 generated by a BPP sensor 144. The BPP sensor 144 measures position of a brake pedal 146 and generates the BPP 142 based on the position of the brake pedal 146. One or more additional BPP sensors may also be provided.

The ECM 116 may control the torque output of the engine 102 further based on one or more one or more other parameters, such as requests from one or more other modules and/or one or more measured parameters. For example only, the ECM 116 may control the torque output of the engine 102 based on requests from the TCM 130, a braking control module 150, and/or one or more other modules. The ECM 116 may control the torque output of the engine 102 based on a latitudinal acceleration of the vehicle, a longitudinal acceleration of the vehicle, and/or one or more other measured parameters. The other measured parameters may include, for example, a mass air flow (MAF), intake air temperature (IAT), coolant temperature, oil temperature, crankshaft position, engine speed, etc.

A longitudinal acceleration sensor (e.g., accelerometer) 156 measures the longitudinal acceleration of the vehicle and generates a longitudinal acceleration signal 152 based on the measured acceleration. A latitudinal sensor 158 measures latitudinal acceleration of the vehicle and generates a latitudinal acceleration signal 154 based on the measured acceleration. In the example of FIG. 1, electrical communication is illustrated by dashed lines.

One or more braking devices, such as brake calipers 160, are associated with each of the wheels of the vehicle. The brake calipers 160 actuate to perform braking and slow the vehicle when brake fluid or another hydraulic fluid is applied to the brake calipers 160. While a disc brake system is shown and described, the brake system of the vehicle may be another suitable type of brake system, such as a drum brake system.

The brake fluid is stored in a brake fluid reservoir 162. When pressure is applied to the brake pedal 146 (e.g., by a driver), the brake fluid is provided to a manifold 164 from the brake fluid reservoir 162. The manifold 164 distributes the brake fluid to each of the brake calipers 160. A brake booster 166 may be implemented to assist the driver in performing vehicle braking when the driver applies pressure to the brake pedal 146.

More specifically, a brake actuator 168 (e.g., a master cylinder) may actuate to provide brake fluid from the brake fluid reservoir 162 to the manifold 164 when pressure is applied to the brake pedal 146. The brake booster 166 may assist the driver in actuating the brake actuator 168 as the driver actuates the brake pedal 146. The brake booster 166 may be connected to the intake manifold 104 via an air one way valve (OWV) 170. The air OWV 170 may be a passive device that opens to increase vacuum within the brake booster 166 when the vacuum within the brake booster 166 is weaker than the vacuum within the intake manifold 104 (i.e., when the pressure within the intake manifold is less than/more negative than the pressure within the brake booster 166).

A fluid OWV 172 may regulate the flow of the brake fluid back to the brake fluid reservoir 162 from the manifold 164. Generally, when the fluid OWV 172 is open, the brake fluid flows back to the brake fluid reservoir 162 from the manifold 164. The braking control module 150 may close the fluid OWV 172 when the driver actuates the brake pedal 146. The braking control module 150 may open the fluid OWV 172 as the driver releases the brake pedal 146.

If the fluid OWV 172 is opened when the driver releases the brake pedal 146 while the vehicle is on a hill, however, the vehicle may begin to roll down the hill. Accordingly, a predetermined period after the driver releases the pressure from the brake pedal 146, the braking control module 150 may begin to open the fluid OWV 172. Waiting to begin opening the fluid OWV 172 until the predetermined period after the brake pedal 146 is released may help prevent the vehicle from rolling down the hill, for example, while the driver transitions from applying pressure to the brake pedal 146 to applying pressure to the accelerator pedal 140. Waiting to begin opening the fluid OWV 172 until the predetermined period after the brake pedal 146 is released on a hill may be referred to as hill start assist (HSA).

A brake fluid pump 174 may be operated under some circumstances to provide brake fluid to the manifold 164 from the brake fluid reservoir 162. For example only, a desired vehicle speed may be set (e.g., by the driver) to a current vehicle speed when a hill descent switch 176 is actuated while the vehicle is traveling down a hill. The braking control module 150 may selectively operate the brake fluid pump 174 to perform vehicle braking while the vehicle travels down the hill. The braking control module 150 may operate the brake fluid pump 174 to limit the vehicle speed to approximately the desired vehicle speed without the driver having to actuate the brake pedal 146. The vehicle speed may be determined, for example, based on one or more wheel speeds, the output shaft speed, or another suitable speed. Operating the brake fluid pump 174 to limit the vehicle speed to approximately the desired vehicle speed while the vehicle travels down a hill may be referred to as hill descent control (HDC). The hill descent switch 176 may be omitted in various implementations.

The braking control module 150 of the present disclosure includes a rolling speed regulator module 190. When the vehicle is stopped facing up a hill while the IMS state 128 indicates that the desired mode of operation is Drive or one of the one or more forward drive ratios, the rolling speed regulator module 190 monitors the BPP 142 and the APP 136. The same is true for when the vehicle is stopped facing down a hill and the IMS state 128 indicates that the desired mode of operation is Reverse.

When stopped on a hill, the rolling speed regulator module 190 selectively maintains the fluid OWV 172 closed for a first predetermined period after the driver releases the brake pedal 146. Maintaining the fluid OWV 172 closed for the first predetermined period may prevent the vehicle from rolling backward down the hill during the first predetermined period. The rolling speed regulator module 190 may begin to open the fluid OWV 172 to begin to release the brakes when the first predetermined period has passed. Opening the fluid OWV 172 may allow the vehicle to begin rolling down the hill.

The rolling speed regulator module 190 may control the opening of the fluid OWV 172 as a function of the period elapsed after the first predetermined period and/or as a function of the distance that the vehicle rolled down the hill. For example only, the rolling speed regulator module 190 may increase the opening of the fluid OWV 172 as the distance increases or as the period increases. The vehicle may roll faster down the hill as the brakes are released.

As the vehicle travels down the hill, the rolling speed regulator module 190 selectively operates the brake fluid pump 174 based on the vehicle speed and a predetermined maximum speed. Operating the brake fluid pump 174 applies the brakes. The rolling speed regulator module 190 may operate the brake fluid pump 174 to limit the vehicle speed to the predetermined maximum speed.

Figure 3:
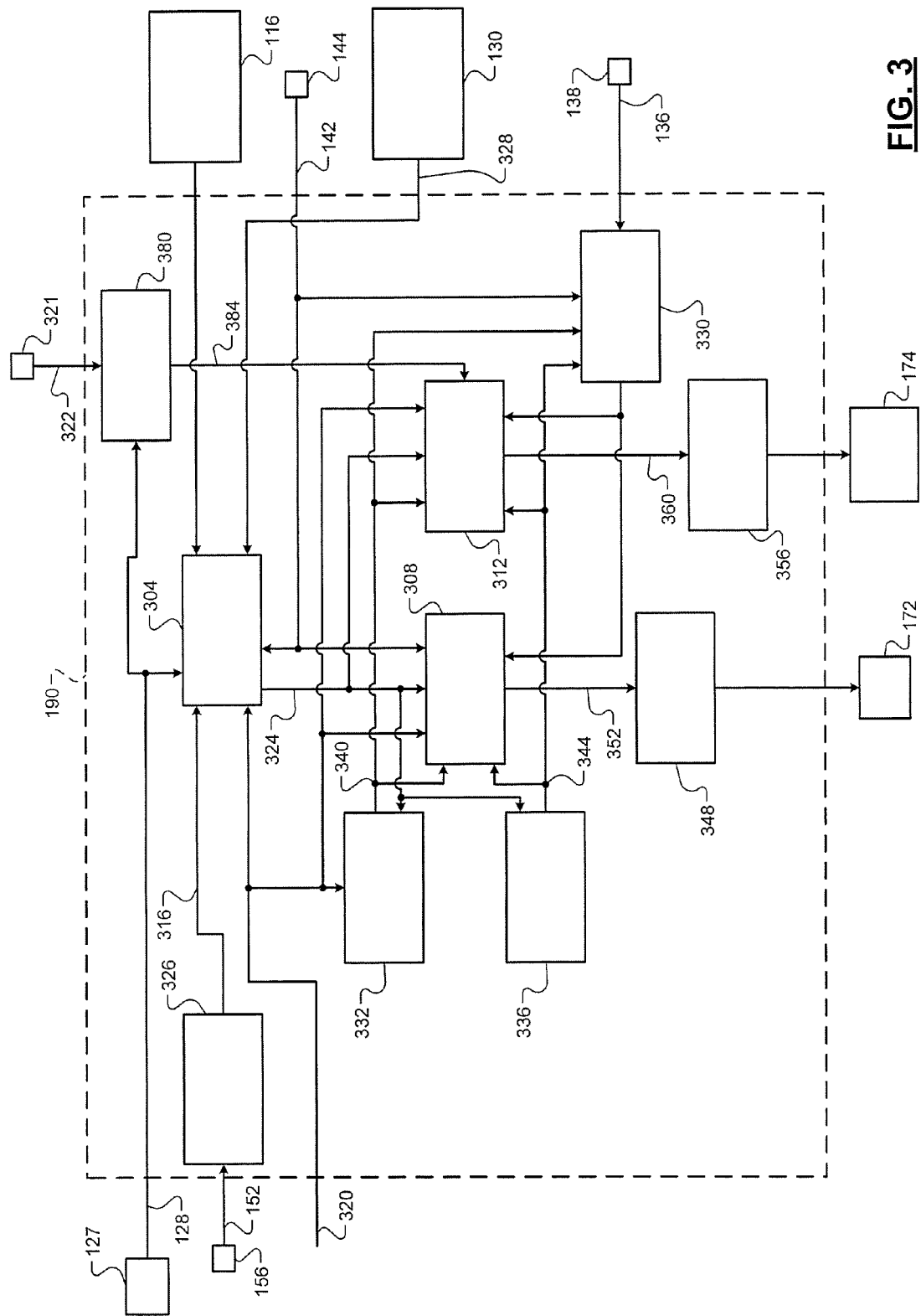
FIG. 3 is a functional block diagram of an example vehicle roll regulation module according to the present disclosure.

Referring now to FIG. 3, a functional block diagram of an example implementation of the rolling speed regulator module 190 is presented. A triggering module 304 selectively triggers a brake releasing module 308 and a brake applying module 312 based on the IMS state 128, a grade 316, a vehicle speed 320, and the BPP 142.

The grade 316 corresponds to the grade of the surface under the vehicle. The vehicle speed 320 may be determined based on one or more wheel speeds, the output shaft speed, or another suitable speed. A wheel speed sensor 321 may generate a wheel speed signal 322 based on a rotational speed of an associated wheel. The wheel speed sensor 321 may also generate the wheel speed signal 322 to indicate the direction of rotation of the associated wheel.

The triggering module 304 triggers the brake releasing module 308 and the brake applying module 312 via a triggering signal 324. The triggering module 304 may, for example, set the triggering signal 324 to an active state (e.g., 0 Volts) to trigger the brake releasing module 308 and the brake applying module 312.

For example only, when the grade 316 is greater than a predetermined positive grade, the triggering module 304 may trigger the brake releasing module 308 and the brake applying module 312 when: (1) the IMS state 128 indicates that the desired mode of operation is Drive or a forward gear ratio; (2) the vehicle speed 320 is zero; and (3) the BPP 142 is greater than a zero BPP. The predetermined positive grade may be, for example, approximately 5% or another suitable value. The BPP 142 may be equal to the zero BPP, for example, when no pressure is being applied to the brake pedal 146. The BPP 142 may be greater than the zero BPP when pressure is being applied to the brake pedal 146.

For another example only, when the grade 316 is less than a predetermined negative grade, the triggering module 304 may trigger the brake releasing module 308 and the brake applying module 312 when: (1) the IMS state 128 indicates that the desired mode of operation is Reverse; (2) the vehicle speed 320 is zero; and (3) the BPP 142 is greater the zero BPP. The predetermined negative grade may be, for example, approximately −5% or another suitable value.

The triggering module 304 may also monitor the APP 136 and require that the APP 136 be a zero APP before triggering the brake releasing module 308 and the brake applying module 312. The APP 136 may be equal to the zero APP, for example, when no pressure is being applied to the accelerator pedal 140.

A grade determination module 326 determines the grade 316. The grade determination module 326 determines the grade 316 based on the longitudinal acceleration 152. The grade determination module 326 may determine the grade 316 further based on one or more other parameters. In various implementations, the grade 316 may be provided, for example, by a global positioning system (GPS) or another suitable system that may supply grade information based on topography and vehicle direction.

The triggering module 304 may additionally or alternatively generate the triggering signal 324 when one or more other suitable conditions are present. For example only, the triggering module 304 may generate the triggering signal 324 when a fault is attributed to the TCM 130. When a fault is present in the TCM 130, the TCM 130 may disengage both of the first and second clutches 202 and 204. Disengaging the first and second clutches 202 and 204 may allow the vehicle to roll. The TCM 130 or another module of the vehicle, such as the ECM 116, may notify the braking control module 150 and other modules of the fault in the TCM 130.

For another example only, the triggering module 304 may generate the triggering signal 324 when the TCM 130 generates a vehicle braking request 328. The TCM 130 may generate the vehicle braking request 328, for example, when a clutch temperature is greater than a predetermined temperature and the grade 316 is between the predetermined minimum and positive grades. Generally, the TCM 130 may partially engage one or more clutches to prevent the vehicle from rolling when the grade 316 is between the predetermined minimum and positive grades. However, friction during the partial engagement causes a clutch temperature to increase. When the clutch temperature is greater than the predetermined temperature, the TCM 130 may generate the vehicle braking request 328 so the brake releasing module 308 and/or the brake applying module 312 can hold the vehicle and the TCM 130 can disengage the clutch to decrease the clutch temperature.

Once triggered, the brake releasing module 308 and the brake applying module 312 control the flow of the brake fluid to and from the manifold 164 to control rolling of the vehicle. The brake releasing module 308 and the brake applying module 312 may control the flow of the brake fluid to and from the manifold 164 until the brake releasing module 308 and the brake applying module 312 are disabled by a disabling module 330.

The disabling module 330 disables the brake releasing module 308 and the brake applying module 312 based on the BPP 142 and the APP 136. For example only, the disabling module 330 disables the brake releasing module 308 and the brake applying module 328 when the BPP 142 is greater than the zero BPP and/or the APP 136 is greater than the zero APP. The BPP 142 and the APP 136 may be greater than the zero BPP and the zero APP when pressure is being applied to the brake pedal 146 and to the accelerator pedal 140, respectively.

A distance determination module 332 and/or a timer module 336 may additionally be triggered by the triggering module 304 when the brake releasing module 308 and the brake applying module 312 are triggered. The distance determination module 332 determines a distance 340 that the vehicle has rolled down the hill since being triggered. The distance determination module 332 may determine the distance 340, for example, based on the vehicle speed 320. For example only, the distance determination module 332 may reset the distance 340 when triggered and may determine the distance 340 based on integrating the vehicle speed 320 over one or more periods. The timer module 336 may reset a timer and start the timer counting when triggered. In this manner, the timer value 344 tracks the period between a present time and the time when the timer module 336 was triggered.

Once triggered, the brake releasing module 308 monitors the timer value 344 and the BPP 142. When the BPP 142 reaches the zero BPP, the brake releasing module 308 maintains the fluid OWV 172 fully closed for a first predetermined period. In other words, the brake releasing module 308 maintains the fluid OWV 172 fully closed for the first predetermined period after the brake pedal 146 is released.

A valve actuator module 348 controls the fluid OWV 172, and the brake releasing module 308 controls the fluid OWV 172 via the valve actuator module 348. For example only, the brake releasing module 308 may generate a desired valve opening 352, and the valve actuator module 348 may control the opening of the fluid OWV 172 to achieve the desired valve opening 352. The brake releasing module 308 may begin opening the fluid OWV 172 when the timer value 344 becomes greater than the first predetermined period. For example only, the first predetermined period may be approximately 1-2 seconds or another suitable period.

When the timer value 344 is greater than the first predetermined period, the brake releasing module 308 may control the opening of the fluid OWV 172 based on the timer value 344 and/or the distance 340 that the vehicle has rolled. For example only, the brake releasing module 308 may increase the opening of the fluid OWV 172 as the timer value 344 increases and/or as the distance 340 increases. The brake releasing module 308 may determine the desired valve opening 352, for example, using one or more functions and/or mappings that relate the timer value 344 and/or the distance 340 to the desired valve opening 352. Opening the fluid OWV 172 allows brake fluid to flow from the manifold 164 back to the brake fluid reservoir 162, thereby releasing the brake calipers 160 and decreasing the amount of vehicle braking being performed. Accordingly, the vehicle speed 320 may increase.

The brake releasing module 308 may control the opening of the fluid OWV 172 such that the fluid OWV 172 reaches a fully open state. For example only, the brake releasing module 308 may control the fluid OWV 172 such that the fluid OWV 172 reaches the fully open state when the timer value 344 is greater than a second predetermined period and/or the distance 340 is greater than a predetermined distance. For example only, the predetermined period may be approximately 10 seconds (including the first predetermined period) or another suitable value. The predetermined distance may be, for example, approximately 40 feet or another suitable value.

The brake applying module 312 monitors the vehicle speed 320. The brake applying module 312 may also monitor the timer value 344 and/or the distance 340. The brake applying module 312 controls operation of the brake fluid pump 174 when triggered. The brake applying module 312 controls operation of the brake fluid pump 174 based on a comparison of the vehicle speed 320 and a predetermined maximum speed as the vehicle rolls down the hill. More specifically, the brake applying module 312 controls operation of the brake fluid pump 174 to limit the vehicle speed 320 to the predetermined maximum speed as the vehicle rolls down the hill. For example only, the predetermined maximum speed may be approximately 5 miles per hour or another suitable value. The predetermined maximum speed may be based on a speed at which the engine 102 will stall when the load on the engine 102 is attributable to the vehicle rolling down the hill in a wrong direction. The wrong direction may be defined relative to a normal direction of vehicle travel in the desired mode of operation. For example only, the wrong direction may be backward when the IMS state 128 indicates that the desired mode of operation is Drive or a forward gear ratio, and the wrong direction may be forward when the IMS state 128 indicates that the desired mode of operation is Reverse.

A pump actuator module 356 controls the brake fluid pump 174. For example only, the brake applying module 312 may generate a desired pump operation signal 360 based on the comparison of the vehicle speed 320 and the predetermined maximum speed, and the pump actuator module 356 may selectively operate the brake fluid pump 174 based on the desired pump operation 360.

Figure 4B:
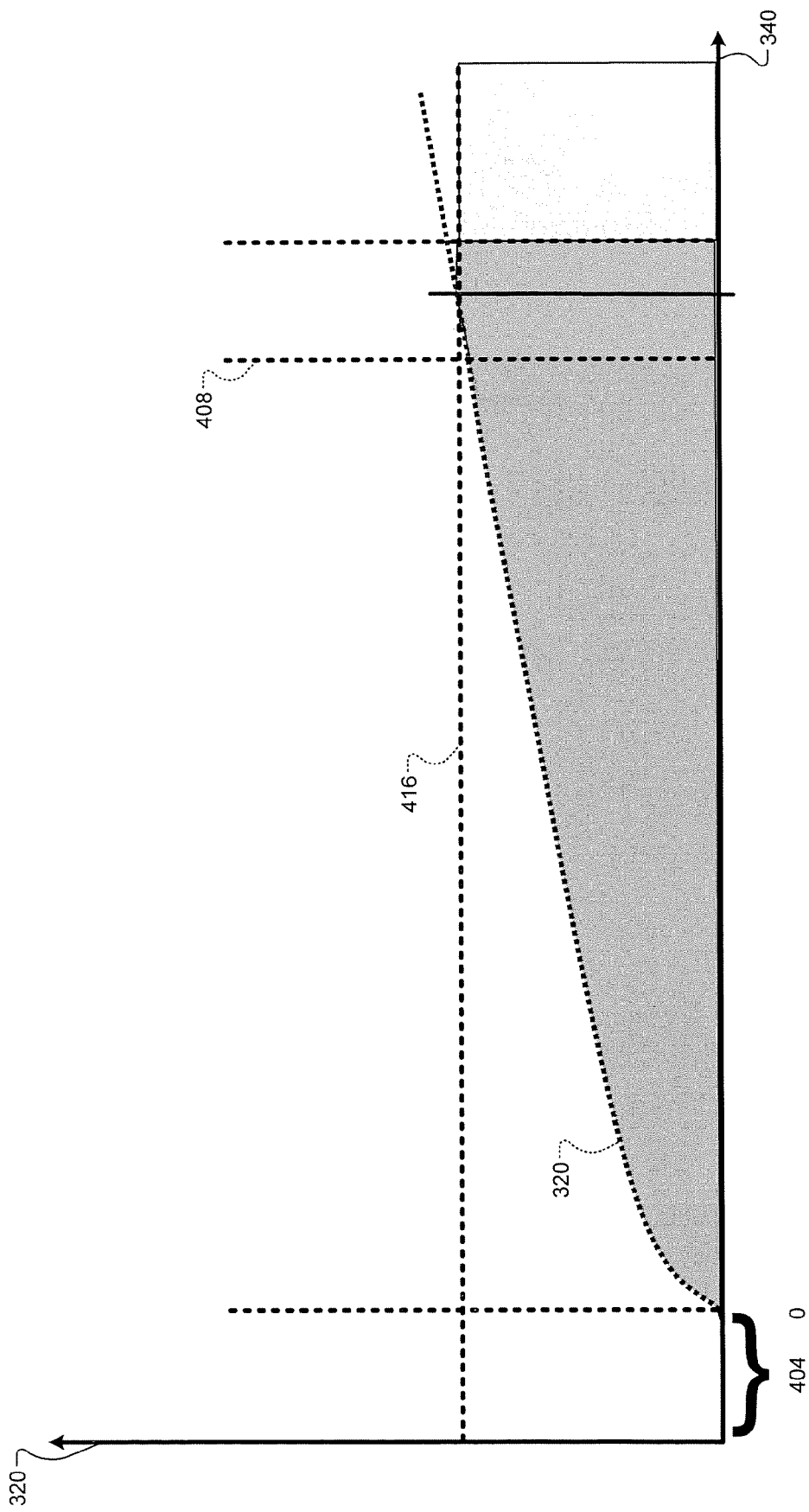
Figure 4C:
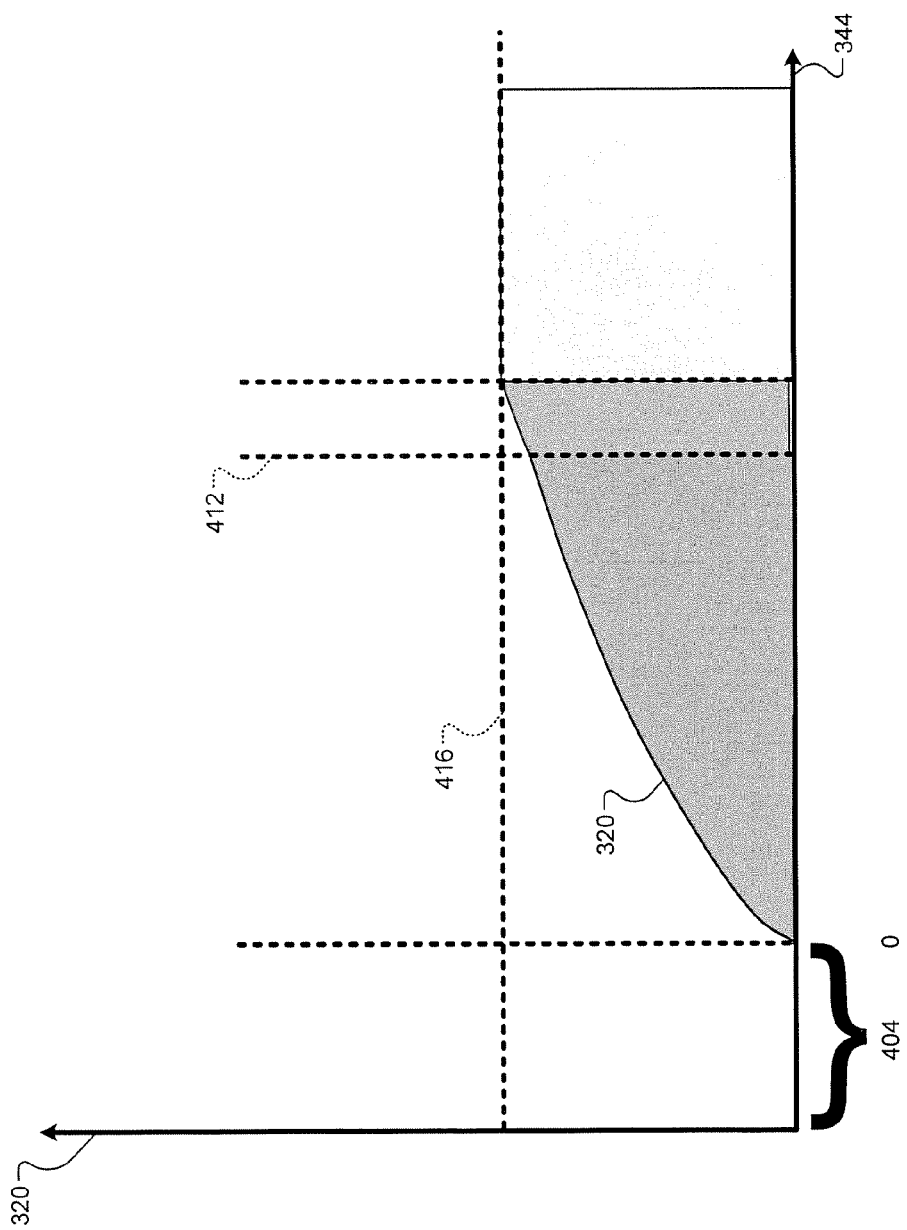

FIGS. 4A and 4B include example graphs of the vehicle speed 320 as a function of the distance 340. FIG. 4C includes an example graph of the vehicle speed 320 as a function of time as tracked by the timer value 344. The vehicle speed 320 begins at zero in the graphs of FIGS. 4A-4C when the brake pedal 146 is released while the vehicle is stopped on a hill. The first predetermined period during which the brake releasing module 308 maintains the fluid OWV 172 in the closed position to hold the vehicle is illustrated by 404.

After the first predetermined period has passed, the brake releasing module 308 begins opening the fluid OWV 172. The vehicle begins rolling down the hill in a direction opposite to the normal direction of travel for the desired mode of operation. The rolling of the vehicle is illustrated by the vehicle speed 320 increasing after the first predetermined period. The brake releasing module 308 may control the opening of the fluid OWV 172 based on the distance 340 rolled down the hill, such as in the examples of FIGS. 4A-4B. The brake releasing module 308 may additionally or alternatively control the opening of the fluid OWV 172 based on the timer value 344, such as in the example of FIG. 4C.

When the distance 340 reaches the predetermined distance 408, such as in the examples of FIG. 4A-4B, the fluid OWV 172 may reach the fully open state. Alternatively or additionally, as in the example of FIG. 4C, the fluid OWV 172 may reach the fully open state when the timer value 344 is greater than the second predetermined period 412.

The brake applying module 312 selectively operates the brake fluid pump 174 based on a comparison of the vehicle speed 320 and the predetermined maximum speed 416. More specifically, the brake applying module 312 selectively operates the brake fluid pump 174 to limit the vehicle speed 320 to the predetermined maximum speed 416. This limits the speed that the vehicle rolls down the hill to the predetermined maximum speed 416.

A direction triggering module 380 may also selectively trigger the brake applying module 312. The direction triggering module 380 may trigger the brake applying module 312 based on the desired mode of operation indicated by the IMS state 128 and a direction of travel of the vehicle. For example only, the direction triggering module 380 may trigger the brake applying module 312 when the vehicle is moving in a backward direction and the desired mode of operation is one of Drive and a forward drive ratio (where the direction of travel should be a forward direction). The direction triggering module 380 may also trigger the brake applying module 312 when the vehicle is moving in the backward direction and the desired mode of operation is Reverse (where the direction of travel should be the backward direction). The forward and backward directions are opposite directions.

The direction of travel of the vehicle may be determined or indicated by the direction of rotation of one or more of the wheels of the vehicle, such as the direction of rotation of the wheel indicated by the wheel speed signal 322. The direction triggering module 380 may, for example, set a signal 384 to an active state (e.g., 0 Volts) to trigger the brake applying module 312. The brake applying module 312 selectively operates the brake fluid pump 174 based on a comparison of the vehicle speed 320 and the predetermined maximum speed 416. More specifically, the brake applying module 312 selectively operates the brake fluid pump 174 to limit the vehicle speed 320 to the predetermined maximum speed 416.

Figure 5A:
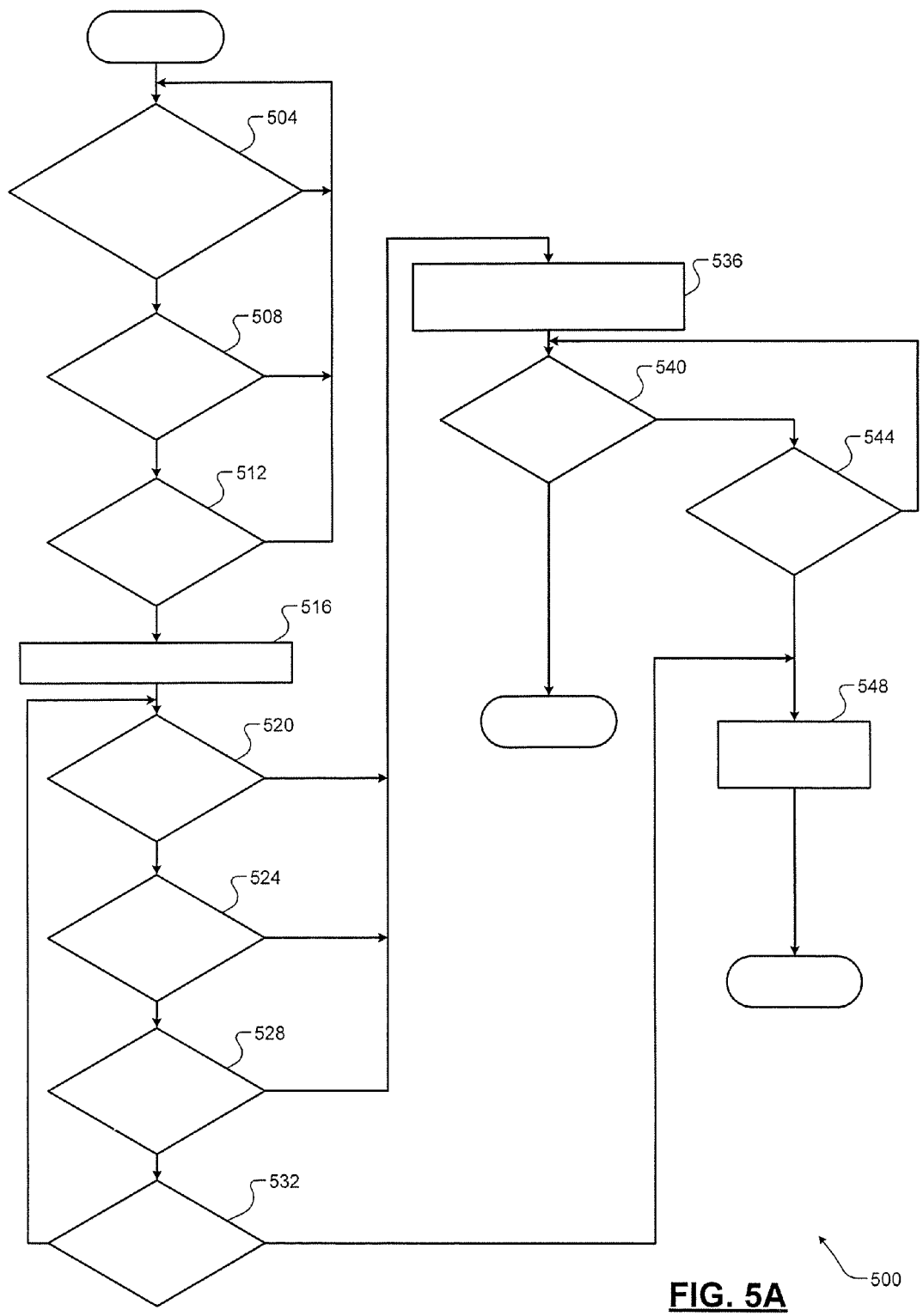
FIGS. 5A-5B include a flowchart of an example vehicle roll-back/roll-forward control method according to the present disclosure.
Figure 5B:
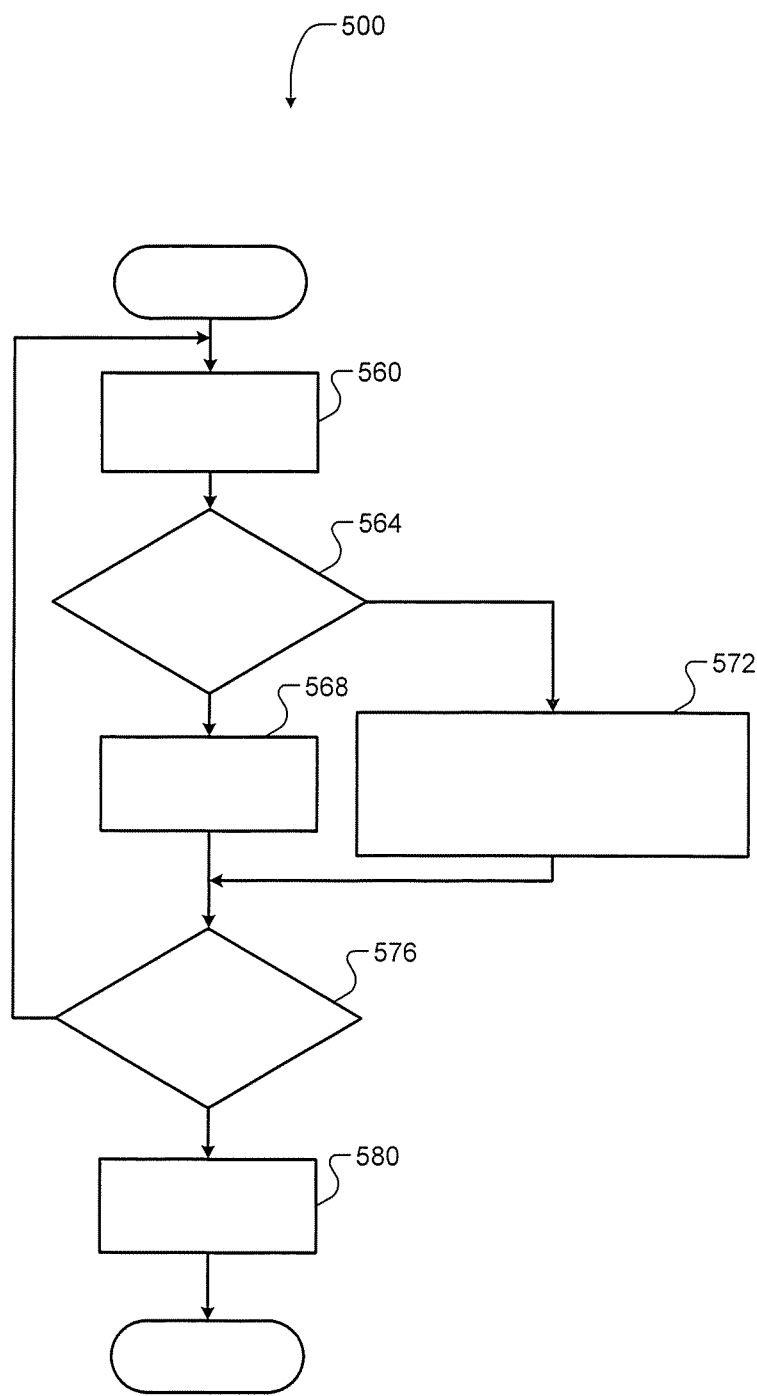

Referring now to FIGS. 5A-5B, a flowchart depicting an example method 500 of controlling vehicle braking is presented. Control may begin with 504 where control determines whether the grade 316 is greater than the predetermined positive grade and the IMS state 128 indicates that the desired mode of operation is one of Drive and a forward gear ratio or whether the grade 316 is less than (i.e., more negative than) the predetermined negative grade and the IMS state 128 indicates that the desired mode of operation is Reverse. If either is true, control continues with 508; if both are false, control may remain at 504.

Control determines whether the vehicle speed is approximately zero at 508. If true, control continues with 512; if false, control may return to 504. At 512, control determines whether the BPP 142 is greater than the zero BPP. If true, the brakes are being applied while the vehicle is stopped on a hill and control continues with 516; if false, control may return to 504.

At 516, control may fully close the fluid OWV 172 if the fluid OWV 172 is not already fully closed. At 520, control determines whether the BPP 142 is greater than the zero BPP. If true, control continues with 524; if false, control may proceed to 536, which is discussed further below. Control determines whether a fault has been diagnosed in the TCM 130 at 524. If true, control proceeds to 536; if false, control may continue to 528. When a fault is diagnosed in the TCM 130, the TCM 130 releases the clutches (e.g., the first and second clutches 202 and 204), which allows the vehicle to roll down the hill.

Control may determine whether the TCM 130 has generated the vehicle braking request 328 at 532. If true, control may proceed to 536; if false, control may continue with 532. Control may determine whether the APP 136 is greater than the zero APP at 532. If true, control may proceed to 548, which is discussed further below; if false, control returns to 520.

At 536, control starts the timer of the timer module 336. Control may also reset the timer to the predetermined reset value at 536. In this manner, the timer value 544 tracks the period elapsed since the BPP 144 reached the zero BPP, the fault was diagnosed in the TCM 130, or the vehicle braking request 328 was received. Control may also reset the distance 340 at 536. Control determines whether the timer value 544 is greater than the first predetermined period at 540. If true, control proceeds to 560 of FIG. 5B, which is discussed further below; if false, control continues with 544.

Control determines whether the BPP 144 is greater than the zero BPP or whether the APP 136 is greater than the zero APP at 544. If true, control may proceed to 548; if false, control returns to 540. At 548, control fully opens the fluid OWV 172 and control may end.

At 560 of FIG. 5B, control determines the distance rolled 540. Control may determine the distance rolled 540 down the hill based on the vehicle speed 320. Control determines whether the distance 540 is less than the predetermined distance at 564. Alternatively, control may determine whether the timer value 540 is less than the second predetermined period at 564. If true, control proceeds to 568; if false, control continues with 572. Control opens the fluid OWV 172 based on the distance 540 at 568, and control continues with 576. If the timer value 540 is less than the second predetermined period at 564, control may open the fluid OWV 172 based on the timer value 544 at 568. At 572, control selectively operates the brake fluid pump 174 to limit the vehicle speed 320 to the predetermined maximum speed, and control continues with 576.

Control determines whether the BPP 144 is greater than the zero BPP or whether the APP 136 is greater than the zero APP at 576. If at least one is true, control may fully open the fluid OWV 172 at 580, and control may end. If both are false, control may return to 560.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for a vehicle on a surface, comprising:
a triggering module that selectively generates a triggering signal when the vehicle is stopped, a grade of the surface is one of greater than a predetermined positive grade and less than a predetermined negative grade, and a brake pedal position is greater than a predetermined brake pedal position,
wherein a brake actuator provides brake fluid to a braking system of the vehicle when the brake pedal position is greater than the predetermined brake pedal position;
a distance determination module that determines a distance traveled since the vehicle was stopped;
a brake releasing module that, after the triggering signal is generated, begins releasing the brake fluid from the braking system a predetermined period after the brake pedal position reaches the predetermined brake pedal position and releases the brake fluid from the braking system based on the distance travelled since the vehicle was stopped; and
a brake applying module that selectively operates a brake fluid pump after the triggering signal is generated based on a comparison of a vehicle speed and a predetermined vehicle speed, the predetermined speed corresponding to the vehicle speed where an engine of the vehicle may stall when an actual direction of movement of the vehicle is a first direction and a desired direction of movement the vehicle is a second direction that is opposite the first direction,
wherein the brake fluid pump provides brake fluid to the braking system when the brake fluid pump is operated.

2. The system of claim 1 wherein the brake releasing module releases the brake fluid from the braking system further based on a period between a present time and a time when the triggering signal is generated.

3. The system of claim 2 further comprising a valve actuator module opens a valve that releases brake fluid from the braking system based on a desired valve opening,
wherein the brake releasing module determines the desired valve opening based on the period and the distance traveled since the vehicle was stopped.

4. The system of claim 2 wherein the brake applying module begins to selectively operate the brake fluid pump when the period is greater than a second predetermined period.

5. The system of claim 1 wherein the brake applying module begins selectively operating the brake fluid pump when the distance is greater than a predetermined distance.

6. The system of claim 1 further comprising a disabling module that selectively disables the brake releasing module and the brake applying module when at least one of the brake pedal position is greater than the predetermined brake pedal position and an accelerator pedal position is greater than a predetermined accelerator pedal position.

7. The system of claim 1 wherein the triggering module generates the triggering signal when the grade is greater than the predetermined positive grade and a desired mode of operation is one of Drive and a forward gear ratio.

8. The system of claim 1 wherein the triggering module generates the triggering signal when the grade is less than the predetermined negative grade and a desired mode of operation is Reverse.

9. A method for a vehicle on a surface, comprising:
selectively generating a triggering signal when the vehicle is stopped, a grade of the surface is one of greater than a predetermined positive grade and less than a predetermined negative grade, and a brake pedal position is greater than a predetermined brake pedal position,
wherein a brake actuator provides brake fluid to a braking system of the vehicle when the brake pedal position is greater than the predetermined brake pedal position;
determining a distance traveled since the vehicle was stopped;
after the triggering signal is generated, beginning to release the brake fluid from the braking system a predetermined period after the brake pedal position reaches the predetermined brake pedal position;
releasing brake fluid from the braking system based on the distance traveled since the vehicle was stopped; and
selectively operating a brake fluid pump after the triggering signal is generated based on a comparison of a vehicle speed and a predetermined vehicle speed, the predetermined speed corresponding to the vehicle speed where an engine of the vehicle may stall when an actual direction of movement of the vehicle is a first direction and a desired direction of movement the vehicle is a second direction that is opposite the first direction,
wherein the brake fluid pump provides brake fluid to the braking system when the brake fluid pump is operated.

10. The method of claim 9 further comprising releasing the brake fluid from the braking system further based on a period between a present time and a time when the triggering signal is generated.

11. The method of claim 10 further comprising:
opening a valve that releases brake fluid from the braking system based on a desired valve opening; and
determining the desired valve opening based on the period and the distance traveled since the vehicle was stopped.

12. The method of claim 10 further comprising beginning to selectively operate the brake fluid pump when the period is greater than a second predetermined period.

13. The method of claim 9 further comprising beginning to selectively operate the brake fluid pump when the distance is greater than a predetermined distance.

14. The method of claim 9 further comprising selectively disabling the releasing of the brake fluid from the braking system and the selective operation of the brake fluid pump when at least one of the brake pedal position is greater than the predetermined brake pedal position and an accelerator pedal position is greater than a predetermined accelerator pedal position.

15. The method of claim 9 further comprising generating the triggering signal when one of (i) the grade is greater than the predetermined positive grade and a desired mode of operation is one of Drive and a forward gear ratio and (ii) the grade is less than the predetermined negative grade and a desired mode of operation is Reverse.

* * * * *